T. L. MORGAN.
BOX.
APPLICATION FILED JAN. 31, 1908.
909,009.
Patented Jan. 5, 1909.
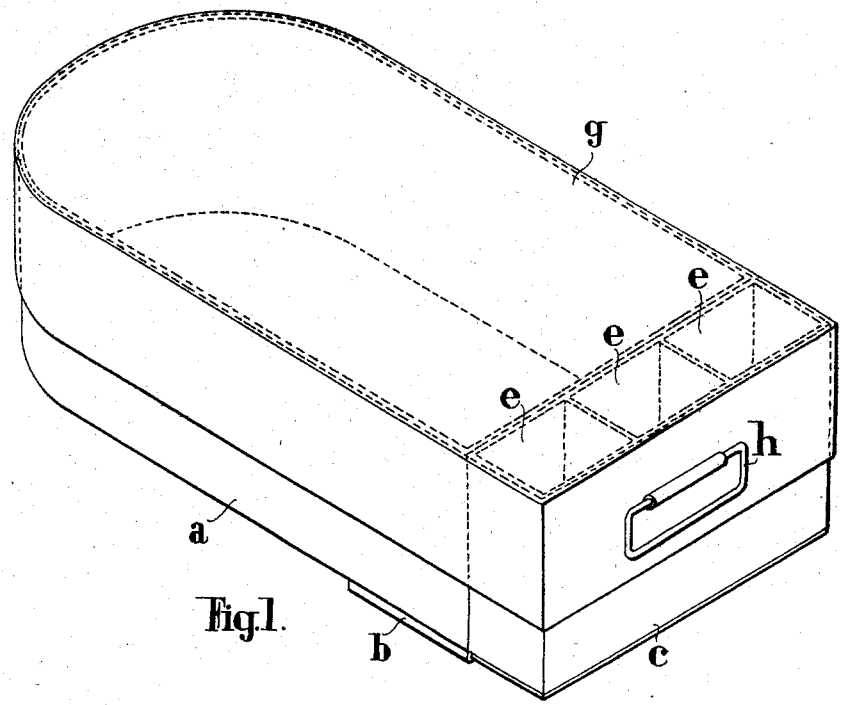
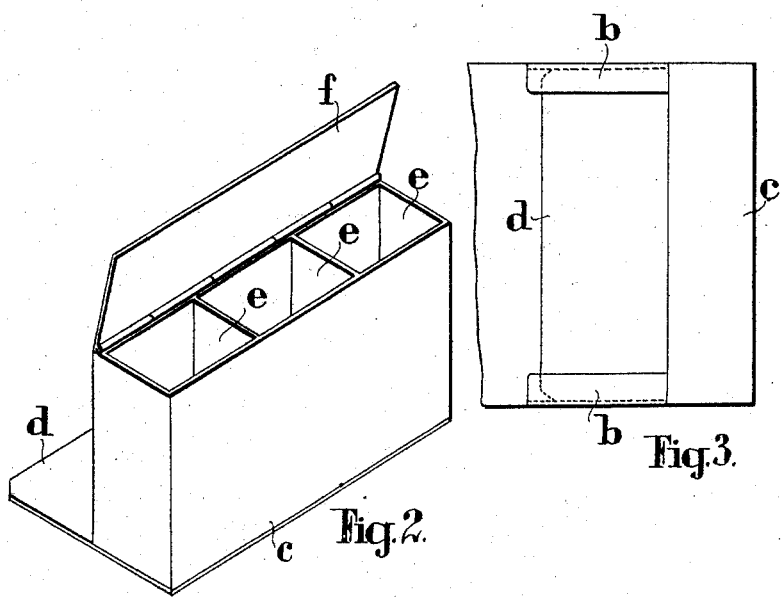

UNITED STATES PATENT OFFICE.

THOMAS LEWIS MORGAN, OF TYWERN, ENGLAND.

BOX.

No. 909,009.  Specification of Letters Patent.  Patented Jan. 5, 1909.

Application filed January 31, 1908. Serial No. 413,638.

*To all whom it may concern:*

Be it known that I, THOMAS LEWIS MORGAN, a subject of the King of England, residing at Tywern, Clydach Vale, Rhondda Valley, Tony-pandy, England, have invented certain new and useful Improvements in Boxes; and I do hereby declare the following to be a full, clear, and exact description of the invention, such as will enable others skilled in the art to which it appertains to make and use the same.

This invention refers to boxes usually employed by laborers, workmen and others for carrying their dinner or other provisions with them.

Boxes for this purpose are usually made of oblong shape or rounded if desired at one end with a cover of a size and shape suitable for sliding over the box where it may be secured in position by any suitable means, the box or cover being provided with a suitable handle.

My invention relates to the combination with a box of the before mentioned description of a secondary box sliding on to or attachable to the dinner box in such a way that one common cover can be used to cover the two boxes when placed together and so that it is difficult or impossible to cover the dinner box without having first placed the secondary box in its proper position. I provide means if found desirable for fastening the boxes together and for fastening the cover on the boxes and a suitable handle may be provided attached to the box or cover for facilitating transport. And in order that my said invention may be better understood I will proceed to describe the same with reference to the drawing accompanying this specification, which shows a typical form of composite box constructed according to my invention.

Figure 1 is a perspective view of the box with the secondary compartment shown dotted; Fig. 2 shows the secondary box or compartment detached from the dinner box; Fig. 3 shows a bottom plan of part of the dinner box.

The same letters of reference are employed to denote the same parts in all the views.

*a* is the dinner box made of tin or other suitable material and preferably of the form shown, that is rounded at one end and rectangular at the other end. At the bottom of the box and on either side towards the rectangular end are guides *b, b*.

*c* is a second box which is of such size that when placed against the box *a* the ends thereof come flush with the sides of the box *a*. This box *c* has attached to it at the bottom a projecting slide *d* which is of such size and shape that it will slide into the guides *b* so that the box *c* may be pushed against the end of the box *a*, where it is retained in position by the said guides *b*.

The box *c* may be divided into any suitable number of compartments *e*. In the drawing the box is shown divided into three such compartments.

*f* is a hinged flap of a size suitable to cover the box or compartment *c* without projecting over the edge of same. *g* is a cover large enough to cover both of the boxes *a* and *c* (when the latter is placed in its proper position with the projecting slide *d* resting in the guides *b*,) and owing to its formation holding the boxes *a* and *c* in position. Attached to this cover may be a handle *h* of any suitable shape. It will be understood that fastenings may be provided if desired for fastening the boxes together or for fastening the cover to the boxes.

The compartments *e* in the box *c* are intended for the reception of such substances as compressed lint, bandages and the like for "first aid" in case of an accident, and the special advantage of the box is that the miner or workman cannot fit the cover on to his dinner box without remembering to attach the secondary compartment intended for the reception of the lint and the like, owing to the difficulty or impossibility of fitting the cover on to the dinner box until the secondary chamber has been placed in position.

It will be evident that the construction of the box may be varied in many ways without departing from the principle of the invention; for instance, the secondary box might be attached at the side of the primary box instead of at the end, the shape of the primary box in that case being suitably modified if found necessary, or the method of attachment of the secondary to the primary box might be varied. For instance, the secondary box might have a tongue or hook attached to the side thereof fitting into a socket or the like on the primary box, the cover in all cases covering both boxes when in position.

What I claim and desire to secure by Letters Patent of the United States of America, is:—

1. A composite box composed of two independent compartments, one of said compartments provided with guides on its bottom near one end; the other compartment provided with a slide extending from its bottom and adapted to enter said guides; and a single cover adapted to fit and cover both compartments when the parts are assembled, substantially as described.

2. A composite box composed of two independent compartments, the one provided with flat guide strips on its bottom near one end; the other provided with a flat slide extending from its bottom, adapted to enter said guides, and thereby cause said second compartment to fit snugly against the outer surface of the end of said first compartment, said second compartment also provided with a cover; and a single cover provided with a handle adapted to fit both compartments, substantially as described.

3. A composite box composed of two independent compartments, the one rounded at one end, provided with flat guide strips on its bottom near one end; the other provided with a flat slide extending from its bottom, adapted to enter said guides, and thereby cause said second compartment to fit snugly against the outer surface of the end of said first compartment, said second compartment also provided with a hinged cover opening toward said slide, and with a plurality of partitions $e$; and a single cover provided with a handle, and with rounded and rectangular ends adapted to fit both compartments, substantially as described.

In testimony whereof, I affix my signature, in presence of two witnesses.

THOMAS LEWIS MORGAN.

Witnesses:
 LOUIS A. LATHROP,
 ALBERT S. PHILLIPS.